United States Patent [19]

Montag

[11] Patent Number: 4,793,744

[45] Date of Patent: Dec. 27, 1988

[54] GRANULAR MATERIAL CONVEYOR

[75] Inventor: Roger A. Montag, Rodman, Iowa

[73] Assignee: Newmatics, Inc., Algona, Iowa

[21] Appl. No.: 926,549

[22] Filed: Nov. 4, 1986

[51] Int. Cl.[4] .......... B65G 53/14

[52] U.S. Cl. .......... 406/153; 406/139; 406/57; 406/123; 111/34

[58] Field of Search .......... 406/139-141, 406/145, 56-59, 61, 92, 96, 108, 122, 123, 151-153, 51-53; 111/77, 34

[56] References Cited

U.S. PATENT DOCUMENTS

| | | | |
|---|---|---|---|
| 594,124 | 11/1897 | Schauman | 406/140 |
| 748,070 | 12/1903 | Henry | 406/140 |
| 748,640 | 1/1904 | Nelson | 406/140 |
| 2,872,248 | 2/1959 | Martin | 406/139 X |
| 3,804,036 | 4/1974 | Seifert, Jr. | 111/34 X |
| 4,227,863 | 10/1980 | Sommerer | 406/151 X |
| 4,409,746 | 10/1983 | Beck | 406/153 X |
| 4,449,862 | 5/1984 | Beck | 406/153 X |

*Primary Examiner*—Sherman D. Basinger
*Assistant Examiner*—Paul E. Salmon
*Attorney, Agent, or Firm*—Zarley McKee, Thomte, Voorhees & Sease

[57] ABSTRACT

A field type granular fertilizer applicator includes a mixing unit for putting the fertilizer into the air carrier medium stream for conveying it to a plurality of applicator knives. The mixing unit includes a passageway between the inlet and the outlet which has a 180° curve with an alternate path that returns to the inlet thereby providing a 360° turn. The granular material is fed into the mixer unit at the approximate radius of curvature center for the curved passageway. The centrifugal movement of the air produces a vacuum at the radius of curvature center allowing for gentle acceleration of the granular material.

8 Claims, 2 Drawing Sheets

GRANULAR MATERIAL CONVEYOR

BACKGROUND OF THE INVENTION

The conveying of particulate material using an air stream or a liquid carrier medium has involved a number of different approaches all of which present varying problems. The power requirements are often times so excessive that the system is impractical. The back pressure at the point where the material is introduced into the air stream is so excessive that blow back becomes a problem. Environmental problems are caused by dust associated with the air pressures involved and the material being conveyed is often lost to the atmosphere. The requirement for high volume of air, high velocity and high pressure can present mechanical problems.

SUMMARY OF THE INVENTION

The mixing unit of the granular material conveyor of this invention is basically foolproof in operation and requires an absolute minimum of power to operate. There are no moving parts and thus maintenance is a minimal problem. More product with less air is moved at a lower pressure than systems now known that are used for similar conveying purposes. The system of this invention utilizes a curved path between the air inlet and outlet which creates a vacuum at the radius of curvature center and this is where the granular material is introduced into the air stream. The air stream can either move along the arcuate path from the inlet to the outlet or continue around in a 360° fashion to the air inlet and be recirculated all the while picking up granular material at the radius of curvature center. The principle may be that of a tornado where the air moves at high velocities and creates a vacuum in the center.

The inlet for the granular material is self-regulated by the simple fact that back pressure is developed when the inlet is full of material and similarly the inlet will be emptied as the air stream can handle more material such that the system is self-unplugging. As an example, tests have shown that utilizing the system of this invention a 5 h.p. power motor will provide fertilizer at the rate of 800 pounds per acre to a 9 row fertilizer applicator while a competing applicator utilizes 28 h.p. to supply fertilizer at 800 pounds per acre on an 8 row machine. The mixing unit of this invention provides gentle acceleration for the material being conveyed and has as its object the preservation of the kenetic energy of the air which through its centrifugal motion produces a vacuum at its center for picking up the material to be conveyed.

DESCRIPTION OF THE PREFERRED EMBODIMENT

Figure 1:
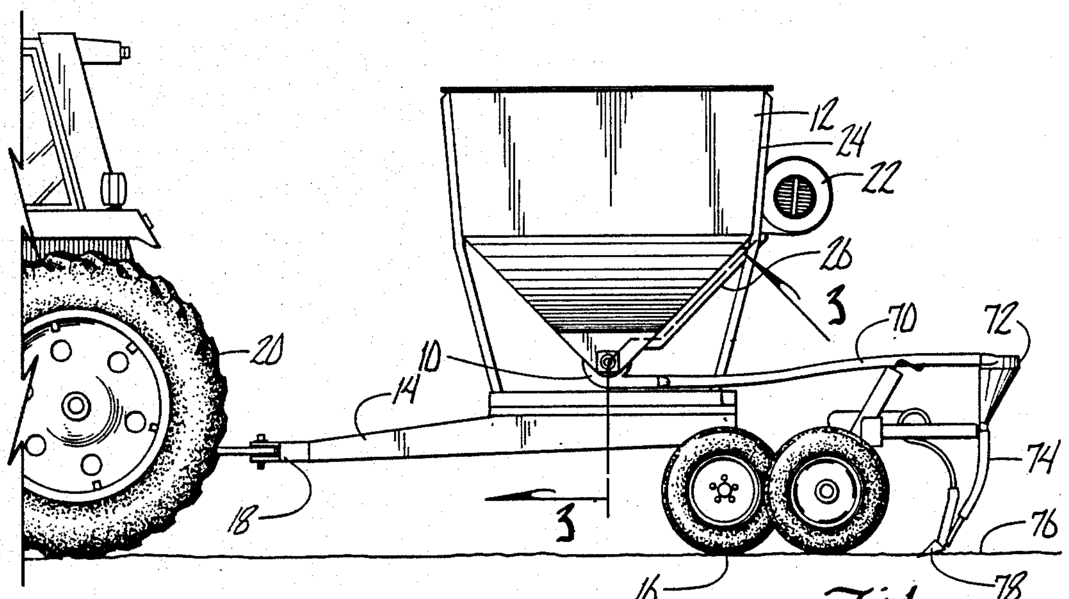
FIG. 1 is a side elevational view of a fertilizer applicator implement utilizing the mixing unit of this invention.
Figure 2:
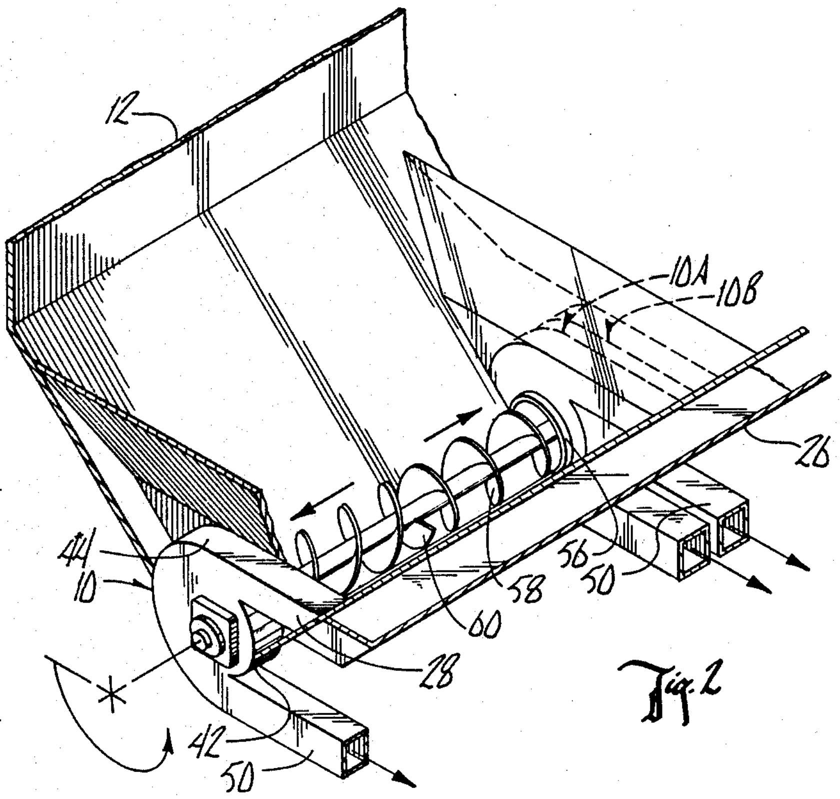
FIG. 2 is a enlarged fragmentary end perspective view of a partial segment of the hopper for feeding the mixing units.
Figure 3:
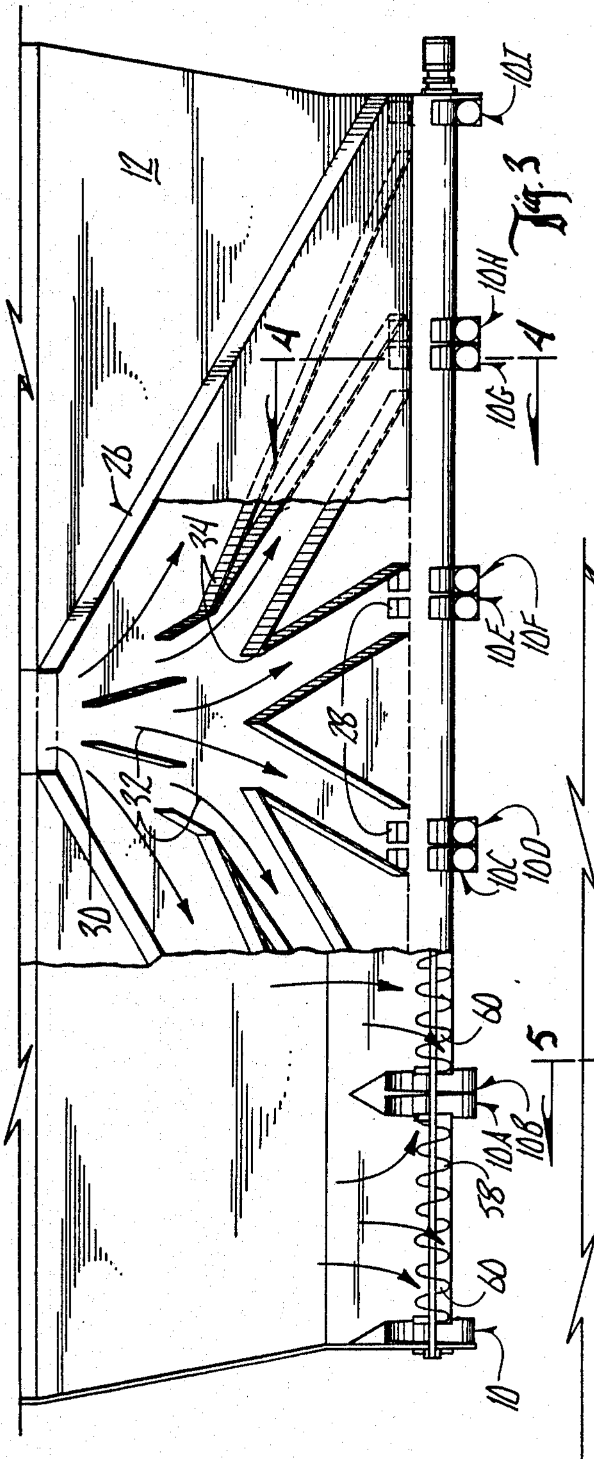
FIG. 3 is a cross-sectional view taken along line 3—3 in FIG. 1 showing the air manifold between the fan and the individual mixing units.

The mixing unit of this invention is referred to in FIG. 1 generally by the reference numeral 10 which is one of a series of mixer units, 10A–10I, as seen in FIG. 3. The mixer units are positioned along the bottom centerline of a hopper 12 carried on a frame 14 having ground support wheels 16 and a tongue 18 connected to a tractor 20.

A carrier medium source includes a blower 22 on the back side 24 of the hopper 12 supplies air through a manifold 26 to the inlet 28 of the mixer unit 10. As seen in FIG. 3, air from the fan 22 is fed into an inlet opening 30 in the manifold 26 and from there the air moves along a maze of passageways connected to the inlets of each of the mixing units, as indicated by the arrows 32. The passageways are defined by a series of baffle walls 34 which are spaced apart such that the air is the same for a uniform carrier medium reaching each of the mixer units.

Figure 4:
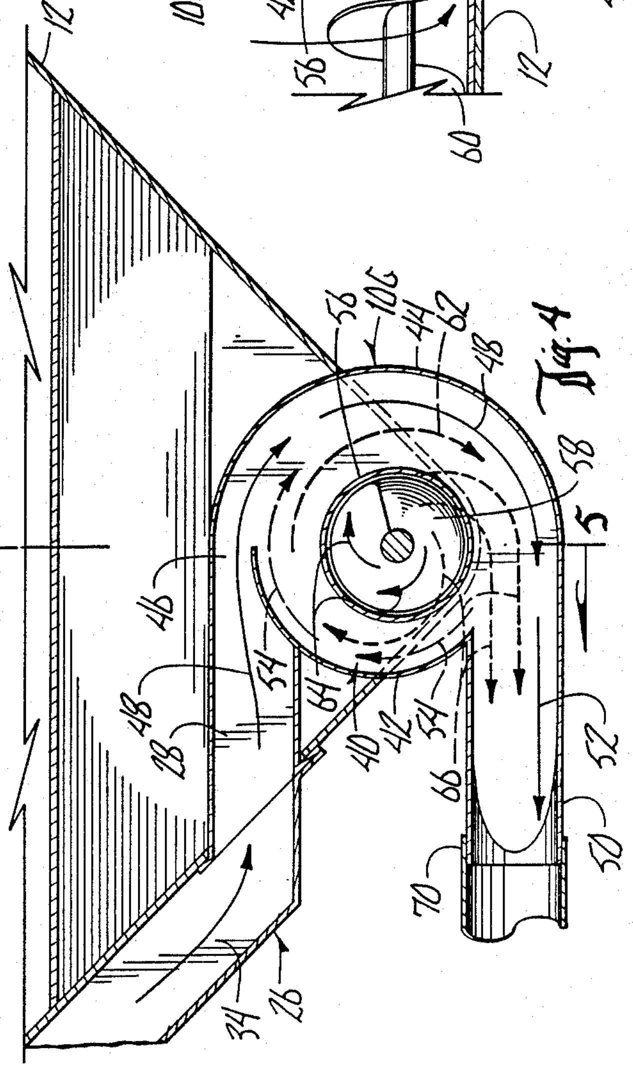
FIG. 4 is a cross-sectional view taken along line 4—4 in FIG. 3 showing the passageways in the mixing unit.

The mixer unit 10, as seen in FIG. 4, receives an air conveyor medium from the manifold 26 which moves through the inlet 28 into a circular chamber 40 defined by an inside substantially circular wall 42 and an outside circular wall 44. An opening 46 is provided into the chamber 40 such that air entering the chamber 40 moves along an arcuate path in a first passageway as indicated by the arrows 48 adjacent the outer curved wall 44. Some of the air exits through an outlet passageway 50 as indicated by the arrow 52 while alternatively air may continue along the curved wall 42 in a second passageway, as indicated by the arrows 54, and join incoming air as indicated by the arrow 48. This movement of air generates a vacuum in the center 56 which is the axial center for the curved walls 42 and 44. The radius of curvature of the outside wall 44 is greater than that of the inside wall 42, thus accelerating the air and granular material moving along the inside wall 42 and maintaining the vacuum at the center 56.

The carrier medium and flowable material in said first passageway form a gradient wall between said first and second passageways and said gradient wall is a substantial extension of the wall 42.

A flowable material source includes granular fertilizer material contained in the hopper 12 is fed into the chamber 40 by auger sections 58. Between adjacent mixer units such as 10 and 10A there are oppositely extending auger sections 60 and 58, respectively, as seen in FIG. 3, which move the granular material in opposite directions but toward the adjacent mixer units. It is further seen in FIG. 4 that the air 48 causes static air 62 in the chamber 48 to begin rotating in a clockwise fashion some of which exits to the outlet 50 while other air returns to the inlet and joins incoming air. Granular material fed into the chamber 40 into the vacuum is accelerated to the speed of the carrier medium, as indicated by the arrows 64 at the center 56, begins to rotate picking up the granular material and rotating it as indicated by the arrow 66. The material 66 also rotates around in a circular path, some of which returns to the inlet opening area 46 where it is joined by new incoming air 48 while other material 66 passes out the outlet opening 50.

An example of the mixer unit of this invention in operation involves granular material having a weight of 70 pounds per cubic foot. Air at the inlet 28 is moving at 13,500 feet per minute at a pressure of 13.5 inches of water. The air maintains its substantial velocity along the outer wall 44 of the mixing unit to the outlet passageway 50 where the velocity may drop to some figure below the inlet velocity. The air pressure may drop to approximately 10 inches of water. Approximately 90 cubic feet of air is provided at the inlet 28. The mixing unit is capable of moving a pound of material with on the average 4.5 cubic feet of air. It appears that more material may be moved with less air as the velocity of the air at the inlet is increased.

It is seen as the material being conveyed 66 reaches the outlet 50 it is then conveyed through pipe 70 through a cyclone unit 72 and downwardly through tube 74 where it is injected into the ground 76 behind a ground knife 78.

It is thus seen that the mixing unit of this invention is capable of operating with less fan speed and less inlet pressure being required. Accordingly, less horse power is required to drive the fan 22 and it may operate at a lower r.p.m. More pounds of material per cubic foot of air may be moved. It is also seen that the conveying medium may be a liquid as well as a gas, such as air. The mixing unit is maintenance free as it involves no moving parts. Excellent mixing is provided by the material being conveyed being moved gently into the air stream as the material enters the mixing chamber 40 at the center thereof where a vacuum exists. Since there is less friction and pressure on the air there is less heat generated by the moving air. There is also less deterioration of the material being conveyed. The material being conveyed may also be liquid, solid or gas material as opposed to granular material as contemplated by the particular fertilizer applicator of this invention.

The mixing unit then may also be mounted in any position including upside down or on its side. The mixing unit may also be made in various sizes for various different applications. Instead of being auger fed it can be gravity fed. It is preferable that in the case of the auger-fed system, as shown in FIG. 4, that the auger rotate in the same direction as the air movement.

Figure 5:
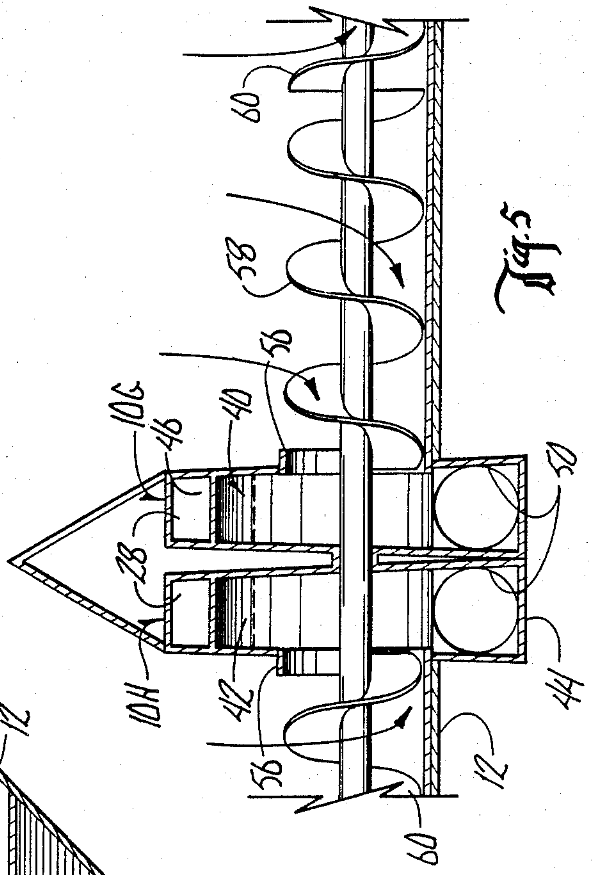
FIG. 5 is a cross-sectional view taken along line 5—5 in FIG. 4.

As seen in FIG. 5 the auger is two inches in diameter and the inlet passageway 28 is one inch in width while the outlet passageway has increased to two inches in width.

What is claimed is:

1. A flowable material conveyor comprising, an air carrier medium source providing a carrier medium moving at a conveying speed, a flowable material source providing flowable material, a mixing unit connected to said carrier medium source and said flowable material source for mixing the flowable material into said carrier medium and accelerating it to the conveying speed of the carrier medium, said mixing unit having a chamber with a substantially 360° curved inner wall surface with a radial center and with an inlet connected to said carrier medium source positioned to move said carrier medium in a stream along said 360° curved inner wall surface and develop a centrifugal force, said chamber having an outlet positioned to provide a discharge for said carrier medium moving along said inner wall surface, a flowable material inlet in said chamber at the substantial radial center of said 360° curved inner wall surface whereby a vacuum is generated at said radial center by the centrifugal force of said carrier medium moving along said curved inner wall surface which in turn draws said flowable material into the stream of moving carrier medium, said 360° inner wall surface includes an outside circular wall extending to said outlet and an inside substantially circular wall oppositely disposed to said outside circular wall and on the opposite side of said radial center therefrom, said inside substantially circular wall extending between said inlet and outlet with the radius of curvature of the outside wall being greater than that of the inside wall whereby air and flowable material are accelerated moving along said inner wall relative to said outer wall at said outlet for maintaining said vacuum at said radial center.

2. The conveyor of claim 1 wherein said mixing unit is one of a plurality of mixing units and said fan is connected to said inlet through a manifold having outlet openings in turn connected to individual mixer unit inlets, said manifold having an inlet and a separate passageway connecting the manifold inlet to each of said manifold outlets and said manifold passageways having a cross sectional area selected to provide uniform carrier medium at each of said manifold outlets.

3. The conveyor of claim 1 wherein said flowable carrier medium is air and said flowable material is a granular material.

4. The conveyor of claim 1 wherein said outlet is further defined as being connected to a conveyor tube in turn connected to an injector means for placing said fertilizer in the ground.

5. The structure of claim 4 wherein said granular material is further defined as being fertilizer.

6. The structure of claim 1 and said chamber increases in cross-sectional area from said inlet to said outlet.

7. A flowable material conveyor comprising, an air carrier medium source providing a carrier medium moving at a conveying speed, a flowable material source providing flowable material, a mixing unit connected to said carrier medium source and said flowable material source for mixing the flowable material into said carrier medium and accelerating it to the conveying speed of the carrier medium, said mixing unit having a substantial radial center and a first outer wall forming a segment of a circular first passageway having opposite ends connecting said air medium source to an outlet, a flowable material inlet in said mixing unit at the substantial radial center of the segment of the circular passageway whereby a vacuum is generated at said radial center by centrifugal force of said carrier medium moving along said passageway which in turn draws said flowable material into the stream of moving carrier medium, a second outer wall forming a segment of a substantially circular second passageway having opposite ends interconnecting the opposite ends of said first passageway on the opposite side of said substantial radial center from said first passageway, and said second outer wall and second passageway being positioned radially inwardly of said first outer wall extended radially outwardly of said second outer wall whereby air and flowable material are accelerated moving in said second passageway along said second outer wall and move in a substantially circular path around said flowable material inlet with the carrier medium and flowable material in said first passageway forming a gradient wall between said first and second passageways, and said gradient wall being a substantial extension of said second outer wall.

8. A flowable material conveyor comprising, a gas or liquid carrier medium source providing a carrier medium moving at a conveying speed, a flowable material source providing flowable material, a mixing unit connected to said carrier medium source and said flowable material source for mixing the flowable material into said carrier medium and accelerating it to the conveying speed of the carrier medium, said mixing unit having a substantial radial center and a first outer wall forming a segment of a circular first passageway having opposite ends connecting said gas or liquid medium source to an outlet, a flowable material inlet in said mixing unit at the substantial radial center of the segment of the circular passageway whereby a vacuum is generated at said radial center by centrifugal force of said carrier medium moving along said passageway which in turn draws said flowable material into the stream of moving carrier medium, a second outer wall forming a segment of a substantially circular second passageway having opposite ends interconnecting the opposite ends of said first passageway on the opposite side of said substantial radial center from said first passageway, and said second outer wall and second passageway being positioned radially inwardly of said first outer wall extended radially outwardly of said second outer wall whereby air and flowable material are accelerated moving in said second passageway along said second outer wall and move in a substantially circular path around said flowable material inlet with the carrier medium and flowable material in said first passageway forming a gradient wall between said first and second passageways, and said gradient wall being a substantial extension of said second outer wall.

* * * * *